United States Patent
Yee et al.

(10) Patent No.: US 8,122,491 B2
(45) Date of Patent: Feb. 21, 2012

(54) TECHNIQUES FOR PHYSICAL PRESENCE DETECTION FOR A COMMUNICATIONS DEVICE

(75) Inventors: Dawson Yee, Bellevue, WA (US); Roy Kuntz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 967 days.

(21) Appl. No.: 11/436,355

(22) Filed: May 18, 2006

(65) Prior Publication Data

US 2007/0268130 A1   Nov. 22, 2007

(51) Int. Cl.
*G06F 7/04* (2006.01)
*G06F 12/14* (2006.01)
*H04H 60/33* (2008.01)

(52) U.S. Cl. ............ 726/9; 726/20; 725/10; 455/229
(58) Field of Classification Search .......... 726/9, 20; 725/10; 455/229
See application file for complete search history.

(56) References Cited

U.S. PATENT DOCUMENTS

| | | | |
|---|---|---|---|
| 5,363,425 A | 11/1994 | Mufti et al. | |
| 5,471,616 A * | 11/1995 | Johnson et al. | 726/34 |
| 5,892,856 A * | 4/1999 | Cooper et al. | 382/291 |
| 5,892,901 A * | 4/1999 | Landwehr et al. | 726/34 |
| 6,189,105 B1 * | 2/2001 | Lopes | 726/20 |
| 6,282,655 B1 * | 8/2001 | Given | 726/34 |
| 6,348,897 B1 * | 2/2002 | Alameh et al. | 343/702 |
| 6,374,145 B1 * | 4/2002 | Lignoul | 700/17 |
| 6,480,753 B1 * | 11/2002 | Calder et al. | 700/83 |
| 6,658,095 B1 * | 12/2003 | Yoakum et al. | 379/93.01 |
| 6,870,916 B2 | 3/2005 | Henrikson et al. | |
| 7,006,833 B1 * | 2/2006 | Contractor | 455/456.1 |
| 7,196,630 B2 * | 3/2007 | Baker | 340/573.1 |
| 7,242,421 B2 * | 7/2007 | Center, Jr. et al. | 348/14.1 |
| 7,299,364 B2 * | 11/2007 | Noble et al. | 713/189 |
| 7,305,437 B2 * | 12/2007 | Horvitz et al. | 709/204 |
| 7,378,939 B2 * | 5/2008 | Sengupta et al. | 340/5.64 |
| 7,400,878 B2 * | 7/2008 | Hassan et al. | 455/410 |
| 7,469,045 B2 * | 12/2008 | Liakis | 379/211.04 |
| 7,536,437 B2 * | 5/2009 | Zmolek | 709/206 |
| 7,540,017 B2 * | 5/2009 | Wakai et al. | 726/3 |
| 7,616,131 B2 * | 11/2009 | Mathews et al. | 340/989 |
| 2002/0085701 A1 * | 7/2002 | Parsons et al. | 379/211.01 |
| 2003/0030624 A1 * | 2/2003 | Aoyama | 345/168 |
| 2003/0154293 A1 * | 8/2003 | Zmolek | 709/228 |
| 2003/0194990 A1 * | 10/2003 | Helferich | 455/412.2 |
| 2003/0203740 A1 | 10/2003 | Bahl et al. | |
| 2004/0039630 A1 * | 2/2004 | Begole et al. | 705/11 |
| 2004/0054803 A1 * | 3/2004 | Ying et al. | 709/238 |

(Continued)

FOREIGN PATENT DOCUMENTS

JP     2004023374 A  *  1/2004

OTHER PUBLICATIONS

"Final Office Action", U.S. Appl. No. 11/441,704, (Dec. 27, 2010), 14 Pages.

(Continued)

*Primary Examiner* — Michael Pyzocha

(57) ABSTRACT

Techniques are provided for determining a physical presence setting. First information is received indicating whether a physical token of a user is detected with respect to a device associated with the user. The physical presence setting for the user with respect to the device is determined in accordance with the first information.

13 Claims, 5 Drawing Sheets

U.S. PATENT DOCUMENTS

| | | |
|---|---|---|
| 2004/0084244 A1* | 5/2004 | Zurek et al. .................... 181/156 |
| 2004/0147278 A1* | 7/2004 | Miramontes ............... 455/550.1 |
| 2004/0161090 A1 | 8/2004 | Digate et al. |
| 2004/0162882 A1* | 8/2004 | Mora ........................... 709/207 |
| 2004/0203520 A1* | 10/2004 | Schirtzinger et al. ......... 455/90.3 |
| 2004/0235520 A1* | 11/2004 | Cadiz et al. ................... 455/557 |
| 2005/0020325 A1* | 1/2005 | Enger et al. ................ 455/575.3 |
| 2005/0084082 A1* | 4/2005 | Horvitz et al. ........... 379/114.06 |
| 2005/0130593 A1* | 6/2005 | Michalak ..................... 455/66.1 |
| 2005/0228882 A1* | 10/2005 | Watanabe et al. ............. 709/224 |
| 2006/0045030 A1 | 3/2006 | Bieselin |
| 2006/0123150 A1* | 6/2006 | Iwai et al. ........................ 710/15 |
| 2006/0128443 A1* | 6/2006 | Takayama et al. ......... 455/569.1 |
| 2006/0135226 A1* | 6/2006 | Won et al. .................. 455/575.3 |
| 2006/0165007 A1* | 7/2006 | Wu ................................ 370/252 |
| 2006/0168653 A1* | 7/2006 | Contrera ........................... 726/9 |
| 2006/0206627 A1* | 9/2006 | Kardach et al. .................... 710/5 |
| 2006/0234676 A1* | 10/2006 | Harris et al. .................. 455/410 |
| 2006/0234758 A1* | 10/2006 | Parupudi et al. ........... 455/550.1 |
| 2006/0258287 A1* | 11/2006 | Bidet et al. .................... 455/41.2 |
| 2006/0265340 A1* | 11/2006 | Ziv et al. ......................... 705/76 |
| 2006/0281503 A1* | 12/2006 | Vigil .......................... 455/575.3 |
| 2007/0032225 A1* | 2/2007 | Konicek et al. ............... 455/417 |
| 2007/0060137 A1* | 3/2007 | Yeatts et al. .................. 455/445 |
| 2007/0078968 A1* | 4/2007 | Kelley et al. .................. 709/224 |
| 2007/0099679 A1* | 5/2007 | Saarisalo ...................... 455/574 |
| 2007/0285502 A1 | 12/2007 | Yee |
| 2007/0287376 A1* | 12/2007 | Pall et al. ........................... 455/1 |
| 2009/0021350 A1* | 1/2009 | Hatta et al. ................... 340/10.1 |

OTHER PUBLICATIONS

"Non-Final Office Action", U.S. Appl. No. 11/411,704, (Dec. 28, 2009),13 pages.

"Non-Final Office Action", U.S. Appl. No. 11/441,704, (Jun. 18, 2010),14 pages.

"Non Final Office Action", U.S. Appl. No. 11/441,704, (Sep. 1, 2011),13 pages.

* cited by examiner

TECHNIQUES FOR PHYSICAL PRESENCE DETECTION FOR A COMMUNICATIONS DEVICE

BACKGROUND

Detection of the physical presence of a user in an office environment may be determined by having the user manually set a presence indicator. An application executing on a user's computer may be used to record a presence indicator setting. The presence indicator may be manually set by a user, such as by selection of a setting using a mouse or other input device connected to the user's computer. One problem with manually setting a presence indicator is that the user may forget to perform necessary manual updates to the presence indicator in accordance with any changes to the user's presence.

In an effort to overcome the foregoing drawback associated with manually setting a presence indicator, another technique provides for updating the presence indicator based on inferences drawn from the activity or inactivity of the user's computer. If there is inactivity on the user's computer, such as may be the result of a screen saver being displayed, the presence indicator setting may be automatically updated to indicate that the user is not physically present. However, concluding such an inference of presence based on computer activity level may also not accurately reflect the actual status of the user's presence. It may be that a user is physically in the office and near his/her computer, but not currently working on the computer. In such instances, the presence indicator may be automatically updated to indicate that the user is not present when the user may in fact be in his/her office performing a task other than one using the computer.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are provided for determining a physical presence setting of a user with respect to a device. The physical presence setting is determined using information including first information indicating whether a physical token of a user is detected with respect to the device associated with the user. Communications to the device may be forwarded in accordance with the physical presence setting.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
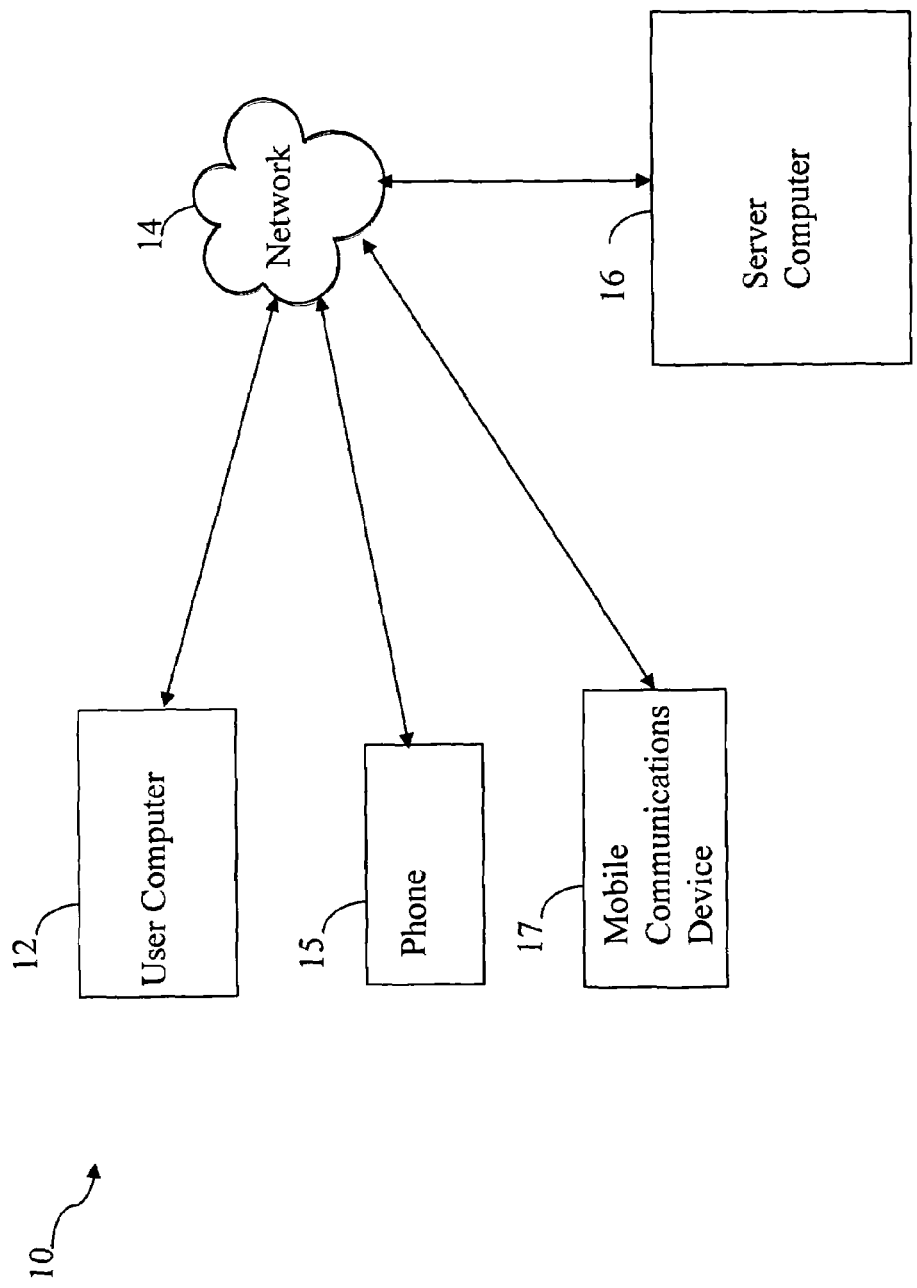
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein in connection with physical presence detection. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 are a user computer 12, a network 14, a phone 15, a mobile communications device 16, and a server computer 16. The mobile communications device 16 may be, for example, a wireless device such as a mobile phone or a PDA. The devices 12, 15 and 17 included in FIG. 1 are exemplary for purposes of illustrating the techniques described herein in connection with physical presence detection. Any device that has connectivity to the server 16 and having the functionality described herein may be included in an embodiment. Additionally, although a particular number of devices are illustrated, an embodiment may use one or more devices. The devices 12, 15, and 17 may include a processor used to execute code included in one or more program modules. Described in more detail elsewhere herein are program modules that may be executed by the devices in connection with the techniques described herein. The devices 12, 15 and 17 may operate in a networked environment and communicate with the server computer 16 and other computers not shown in FIG. 1.

In operation, an incoming transmission for a user may be received by the server computer 16. The incoming transmission is then forwarded to the appropriate one or more registered devices associated with a user identifier for the particular user. As will be described in more detail in following paragraphs, the incoming transmission may be forwarded to a device in accordance with a physical presence setting or indicator as may be determined for each device. For example, as will be described herein in more detail, when a user is determined to be physically "present" with respect to a registered device for the user, the device may be set to operate in accordance with the current "present" mode. When the user is determined to be physically "away" with respect to the device, the device may be set to operate in accordance with the "away" mode.

It will be appreciated by those skilled in the art that although the devices 12, 15, and 17 are shown in the example as communicating in a networked environment, the devices 12, 15, and 17 may communicate with other components utilizing different communication mediums. For example, the user computer 12 may communicate with one or more components utilizing a network connection, and/or other type of link known in the art including, but not limited to, the Internet, an intranet, or other wireless and/or hardwired connection(s).

Figure 2:
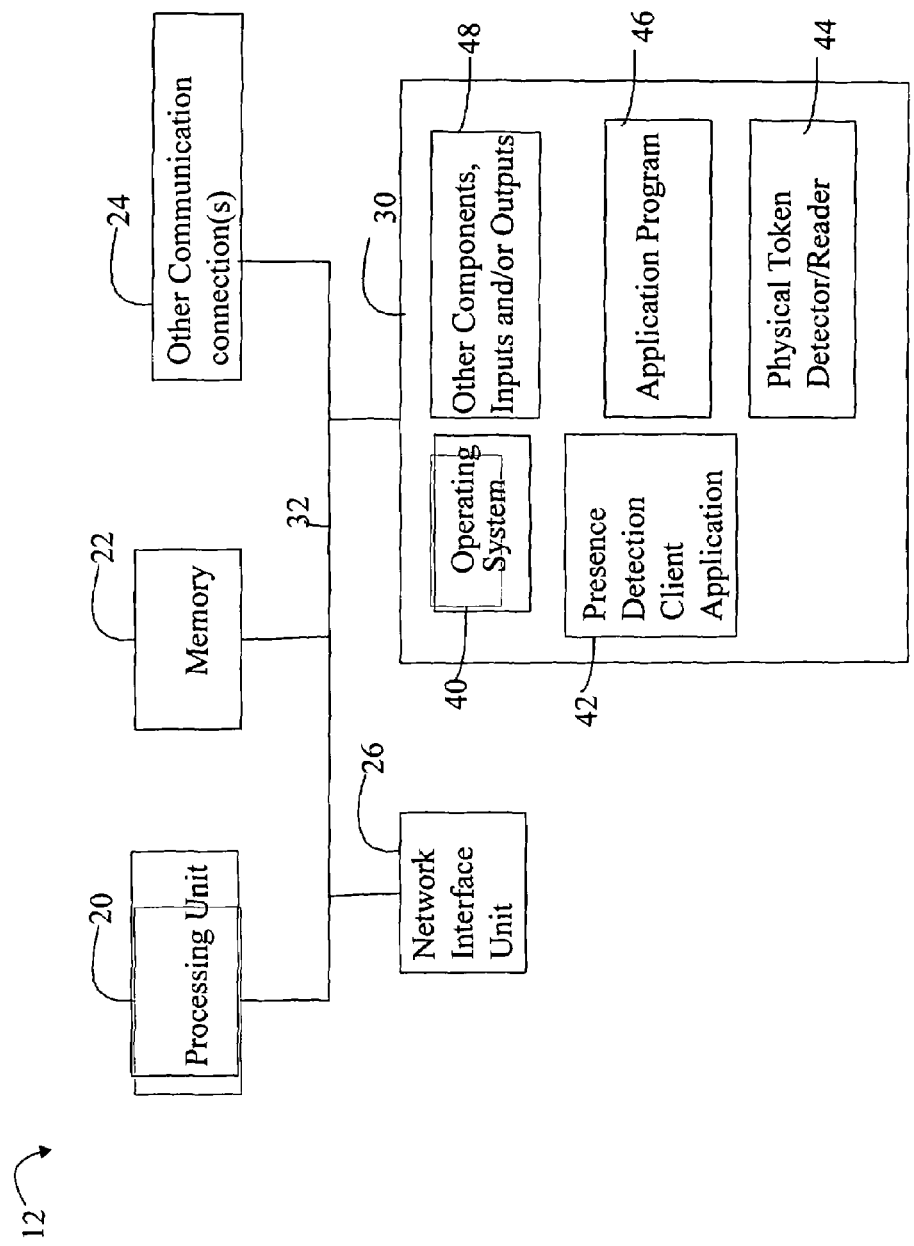
FIG. 2 is an example of components that may be included in an embodiment of a user computer for use in connection with performing the techniques described herein.

Referring now to FIG. 2, shown is an example of components that may be included in one of the devices, the user computer 12, as may be used in connection with performing the various embodiments of the techniques described herein. The user computer 12 may include one or more processing units 20, memory 22, a network interface unit 26, storage 30, one or more other communication connections 24, and a system bus 32 used to facilitate communications between the components of the computer 12.

Depending on the configuration and type of user computer 12, memory 22 may be volatile (such as RAM), non-volatile (such as ROM, flash memory, etc.) or some combination of the two. Additionally, the user computer 12 may also have additional features/functionality. For example, the user computer 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the user computer 12. The storage 30 in one embodiment may be a mass-storage device with associated computer-readable media providing non-volatile storage for the user computer 12. Although the description of computer-readable media as illustrated in this example may refer to a mass storage device, such as a hard disk or CD-ROM drive, it will be appreciated by those skilled in the art that the computer-readable media can be any available media that can be accessed by the user computer 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by user computer 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The user computer 12 may also contain communications connection(s) 24 that allow the user computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media.

In one embodiment, the user computer 12 may operate in a networked environment as illustrated in FIG. 1 using logical connections to remote computers through a network. The user computer 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the user computer 12, one or more of these elements included in the storage 30 may also reside in a portion of memory 22, such as, for example, RAM for controlling the operation of the user computer 12. The example of FIG. 2 illustrates various components including an operating system 40, a presence detection client application 42, a physical token detector/reader 44, one or more application programs 46, and other components, inputs, and/or outputs 48.

The operating system 40 may be any one of a variety of commercially available or proprietary operating systems. The operating system 40, for example, may be loaded into memory in connection with controlling operation of the user computer. One or more application programs 46 may execute in the user computer 12 in connection with performing user tasks and operations.

The presence detection client application 42 may be characterized as a client application which is used in connection with setting and/or detecting the physical presence of a user with respect to a device. The client application 42 communicates presence-related information to the server computer. Such presence-related information may include, for example, a determination regarding the detected physical presence of a user, and other information as described in more detail herein. In one embodiment as described herein, the physical presence setting may be determined in accordance with one or more components of presence-related information. A first component used in determining a physical presence setting may be generated by the physical token detector/reader module 44. Additionally, an embodiment may determine a physical presence setting using a manually specified physical presence setting and/or one or more other secondary indicators as described in following paragraphs. As described herein, the secondary indicators may include static and/or dynamic information. Both the first component and any other presence-related information produced on the user computer or other device may be communicated to the client application 42 as described herein. The client application 42 may then communicate such information to the server 16.

It should be noted that any one of a variety of different techniques may be used to communicate the presence-related information to the server computer. For example, the information, and any updates or changes thereto, may be pushed from the user computer 12 to the server computer. It will be appreciated by those skilled in the art that other techniques, such as pulling information from the user computer, polling, and the like, may also be used.

The physical token detector/reader module 44 may be used in connection with generating the foregoing first component of presence-related information. The detector/reader module 44 may be used to detect the physical proximity or presence of a physical token that is carried by a user. The physical token may be, for example, a tag such as an RFID or infrared tag that is carried by a user. Encoded on the tag may be information identifying the user. When the user with the tag is in close proximity to the detector/reader module 44, the module 44 reads the information on the tag and communicates the information to the presence detection application 42 where the first component of the user's physical presence setting as communicated from the detector/reader module 44 is determined to be "present". When the user and the physical token move away or out of range of the module 44, the first component of the user's physical presence setting as generated by the detector/reader module 44 is determined to be "away" or not presently near the device containing the detector/reader module 44. Thus, the physical presence or proximity of the user with respect to the device, which in this example is the user computer 12, is determined by communicating with the physical token.

Described above are some examples of physical tokens that may be used in connection with wireless communications. As another example, a user may wear a headset that operates in accordance with the Bluetooth® wireless connectivity standard. A device, such as a phone, may include a Bluetooth®-based receiver which operates with the foregoing headset. In this example, the physical token may be the headset and the receiver may communicate information to the presence detection application 42 regarding the physical proximity or presence of the headset. The presence detection application 42 may determine the user's physical presence setting in accordance with one or more components of presence-related information including a first component related to the physical presence or proximity of a user wearing the headset with respect to the receiver. Other types of physical tokens may include those containing magnetically encoded data.

It should be noted that the detector/reader module 44 may vary in accordance with the types of physical tokens used in an embodiment. The physical tokens that may be used in an embodiment in connection with the techniques described herein are also not limited to those which may be characterized as wireless or otherwise operating without having the token come into direct physical contact with the detector/reader module 44. An embodiment may also use physical tokens which operate by coming into direct physical contact with the detector/reader module 44. For example, in another embodiment, the user may have a physical token which is a card, such as Smart Card. The card may be, for example, a pocket-sized card with embedded information thereon including information identifying the user. The card may be physically inserted into a Smart Card or other card reader to obtain the information identifying the user.

An embodiment may also include a manual physical presence setting option so that a user may manually specify a value used in place of the first component of presence-related information as determined using the module 44. The manual option may be set by specifying an input value communicated to the presence detection application program 42. For example, the user may specify the foregoing value manually to indicate a status of "present" or "away" with respect to the device. Such an option may be used, for example, as an override option in connection with determining a physical presence of a user for a device in the event that a user may not have their physical token.

It should be noted that in addition to detecting that a user, via his/her physical token, is "present" or "away" from a device, an embodiment of the module 44 or other component may determine a proximate distance of the user from the device. In such instances, the distance information may be used to affect or otherwise set operating characteristics of the device. For example, if a user is a first distance from his/her stationary office phone, any incoming calls may be directed to the phone which will ring at a first volume level. If the user moves to a second farther distance, the incoming calls may be directed to the phone which will ring at a second increased volume level. The current operating characteristics of the device may be set in accordance with the user's physical presence information.

The application program 46 may be, for example, code which monitors the activity on the computer 12 causing display of a screensaver when there is inactivity. One or more such application programs may be used in generating one or more secondary indicators communicated to the presence detection client application 42. Secondary indicator information may then be communicated to the server computer. For example, when the screensaver is displayed, an application program may provide a secondary indicator to the client application 42 indicating that the user is "away" from the device, which in this example is a computer.

In one embodiment, the device 12 may include an application program 46 that is a client-side calendar and scheduling program reporting scheduling information to a central location, such as to a server-side calendar and scheduling application on server 16. The client and server-side calendar and scheduling applications may be utilized to schedule meetings, keep a calendar of activities, appointments, and the like. A secondary indicator may be generated in accordance with querying the server-side calendar and scheduling application for one or more data items. The data items may include information about whether the user's calendar indicates a scheduled meeting or appointment (e.g., is time blocked out as busy or taken). For each scheduled meeting, the corresponding appointment entry may be parsed to search for keywords in a subject line or other fields. From the existence of particular keywords in the entry, additional availability inferences may be concluded. Such inferences may be included in the secondary indicator information from the server-side calendar and scheduling application. For example, the appointment entry may indicate "out of office" or at an offsite meeting (e.g. physically away from devices in the office), an onsite meeting (e.g. physically in the office but having limited availability to take certain types of communications such as text messages), "office hours" (e.g., physically present and near devices in the office and available to take all communications), and the like.

As an alternative to, or in addition to, the foregoing in which an inference is drawn from the context of an entry, an embodiment of the client-side and server-side calendar and scheduling applications may include functionality for explicitly setting an appointment indicator, such as from a menu selection, which is the associated with an appointment entry. As with the use of the keywords, the appointment indicator may provide additional information regarding the appointment. Such information may be included in the secondary indicator information from the server-side calendar and scheduling application. Using such additional information may allow a finer granularity of filtering of communications to a user at one or more devices. For example, an embodiment may assume that whenever a calendar indicates a scheduled appointment, the user is busy and unable to take any communications. If additional information regarding the scheduled appointment is provided, such as with the appointment indicator or detected keywords, a finer granularity of filtering of communications to the device may be performed. For example, a scheduled appointment may be for a meeting as determined using the keywords or explicitly set appointment indicator from the entry associated with the scheduled meeting. As such, the user may be able to accept text messages transmitted to the user's a registered mobile device. Secondary indicator information such as the foregoing may be used in filtering communications to the user on his/her mobile device during the times of the scheduled meeting. The secondary indicator information may indicate the type or mode of communications allowed (e.g., text) and the date/time of the meeting. The secondary indicator generated by the server-side calendar and scheduling program may provide an indication that the user is "present" or "away" with respect to a device and/or location, such as an office. Additionally, the secondary indicator may provide other information used to determine if one or more modes of communication may be transmitted to a particular device. For example, if the calendar indicates a user is in a meeting, the secondary indicator may indicate that, for the duration of the meeting, only text communications may be transmitted to a device.

It should be noted that a secondary indicator may be used in connection with the device on which a client-side application program executes and possibly other devices which may not have a corresponding client-side portion executing thereon. For example, if the client-side calendar and scheduling application as described herein is on a personal computer in the office, secondary indicators generated using the calendar entry for a meeting (e.g., as obtained from the server-side portion of the application) may affect transmissions to the personal computer as well as a phone or other devices known to be in the same physical location as the personal computer. The other devices may not have a client-side calendar and scheduling application executing thereon. If the user is at an offsite meeting, communications directed to a device in the office location, such as an office phone, may be affected by information obtained from the server-side application, such as by having any voice transmissions for the office phone forwarded directly to voicemail. Whether an embodiment uses collected information to make such inferences applicable to more than one device may vary with embodiment.

Secondary indicators may also be inferred from dynamic physical attribute information regarding the current physical state of the device. Such information may be used in filtering certain communications to associated devices. The types or modes of communication to forward or otherwise filter to a device may be inferred from a physical state of the device. For example, if a cover is over a display of a mobile device (e.g., in a closed position), it may be inferred that the user does not want to view text messages or examine information that may be displayed regarding an incoming call. In this instance where the mobile device is capable of receiving text and voice transmissions, both modes may be disabled in response to the closed positioning of the cover. Similarly, if a cover over a keyboard of a device is in a closed position, it may be inferred that the user does not want to receive text messages. In another example, if a mobile phone is retracted/folded with the display showing, it may be inferred that voice transmissions but not text transmissions should go to the mobile phone. A user may set the mobile phone to the foregoing, for example, while driving and using a hands-free phone attachment. The user is able to have a telephone conversation but is not able to process text messages. In yet another example, if the mobile phone is retracted/folded and a cover is placed over the display so that displayed data cannot be viewed, it may be inferred that all voice communications to the device should go directly to voicemail. In connection with the foregoing, code executing on the device may monitor the current physical state of the device and communicate such information as secondary indicator information to the client application 42 which may then be communicated to the server computer.

Other forms of secondary indicator information are described elsewhere herein.

As described above, the presence detection client application 42 receives information from the physical token detector/reader module 44 used in connection with generating the foregoing first component of presence-related information. An embodiment may provide the first component, one or more secondary indicators and/or a manual physical presence setting to the client application 42. As described herein, the manual setting and/or secondary indicators may be used in combination with the first component to generate a final setting regarding the physical presence of a user with respect to a device. Depending on the particular secondary indicator information, the secondary indicator information may also be used in connection with forwarding communications to user devices. The client application 42 may communicate all received information including the first component, manual setting, and any secondary indicator information to the server computer. As described herein, a secondary indicator may include additional information used in making a final determination regarding physical presence. A secondary indicator may also include other information used in determining what modes of communications are routed or forwarded to a device.

It should be noted that in one embodiment described herein, a final physical presence setting may be determined as a composite of the first component, manual presence setting, and/or secondary indicator information. In one embodiment described herein, the determination regarding the final physical presence setting is performed by the presence aggregation engine of the server computer.

Although details of one particular device, the user computer 12, have just been described, it will be appreciated by those skilled in the art that other devices, such as 15 and 17, may include components similar to those described in connection with the user computer 12 to perform the presence detection techniques described herein.

Figure 3:
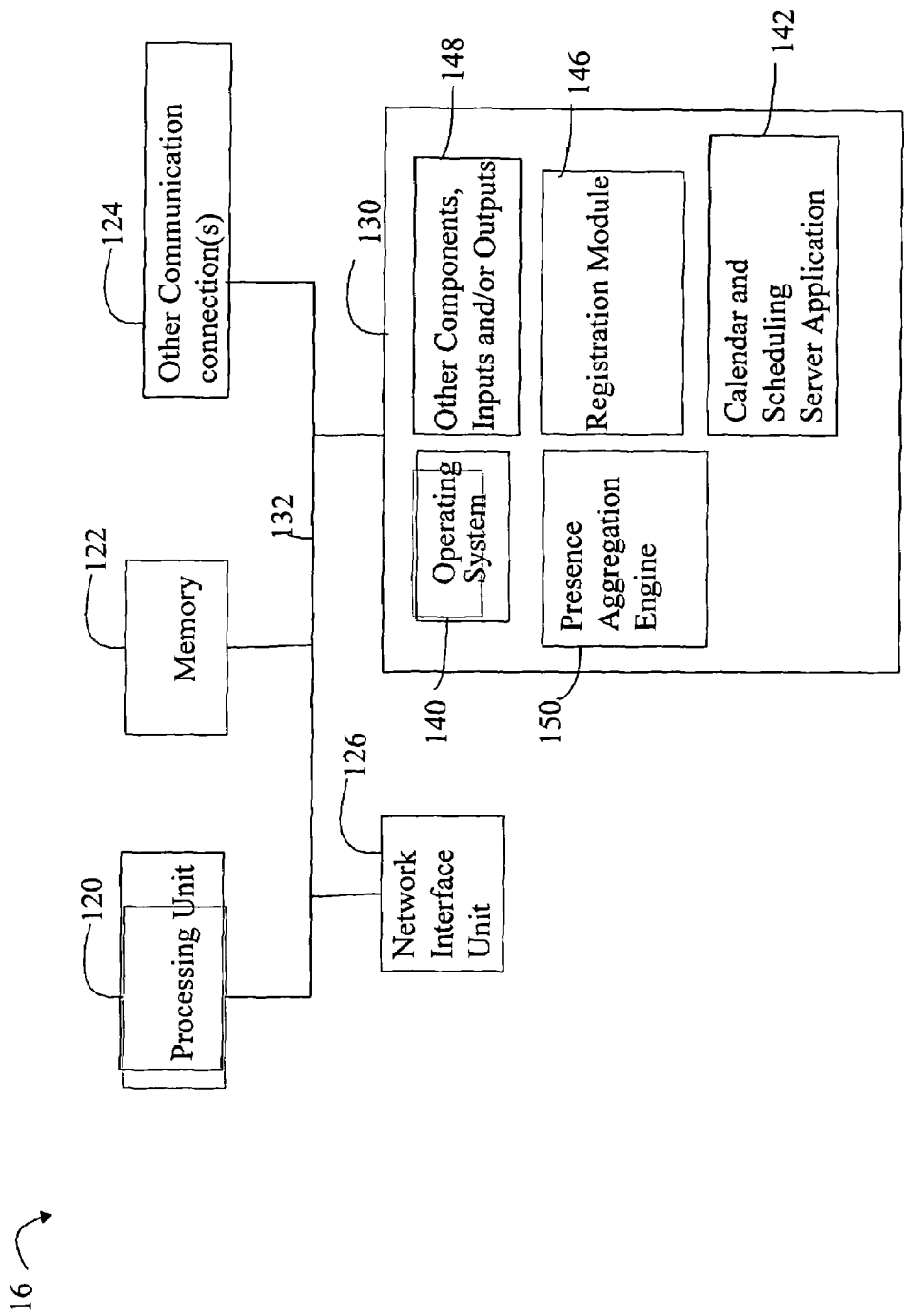
FIG. 3 is an example of components that may be included in an embodiment of a server computer for use in connection with performing the techniques described herein.

Referring now to FIG. 3, shown is an example of components that may be included in the server computer and used in connection with performing the various embodiments of the techniques described herein. As illustrated in FIG. 3, an embodiment of the server computer 16 may include components similar to those described in connection with FIG. 2. Additionally, the server computer 16 may include a presence aggregation engine 150, a calendar and scheduling server application 142, and a registration module 146. In one embodiment, the server computer 16 may be a communication server which communicates with one or more devices for registered users.

The registration module 146 may be used in connection with registration of a user. As part of the registration process, the user may be assigned a user identifier and register one or more associated devices for the particular user identifier. The user may also be assigned a password or other information used in connection with device authentication. The user identifier may be included on the physical token identifying the user as described elsewhere herein. As an example of device registration, a user may register multiple devices as illustrated in FIG. 1 which are associated with the user's identifier. Each device, such as a phone, computer, mobile phone, or PDA, may have its own IP address or associated location so that the device may be identified in the network in connection with communications, such as for forwarding an incoming transmission received at the server computer 16. Each registered device may have an associated one or more modes of communication. Modes of communication may include, for example, voice, text, and/or video, indicating which types of communication a particular device is capable of. For example, a mobile device may be capable of voice, text and video. An older device may only be capable of voice and text. A particular computer system that is registered may be capable of only voice and text. The modes of communication which a device is capable of may vary in accordance with the particular device and associated configuration.

The calendar and scheduling server application 142 is a server-side application which, as described elsewhere herein, collects and maintains calendar and appointment information for one or more users. Schedule and appointment information may be communicated from a corresponding client-side portion of the application residing on one or more user devices.

The presence aggregation engine 150 aggregates physical presence settings and other presence-related information of one or more devices for a registered user. The other presence-related information may include the manual physical presence setting for a device and secondary indicator information described herein. The engine 150 may query the server application 142 to obtain a portion of the secondary indicator information regarding schedules and appointments. The secondary indicator information may include static and/or dynamic information. Secondary indicator information that is static may include, for example, registration information such as what devices are associated with a user identifier and the modes of communication capable by each device. This information may be characterized as static in that it may not be modified in accordance with changing or dynamic aspects of the system. Secondary indicator information that is dynamic may be, for example, information communicated to the engine 150 from the device and used in connection with filtering different modes of communications to a device as described elsewhere herein.

Information as maintained by the engine 150 may be made available to registered users so that one registered user may be aware of the final physical presence setting as determined using the techniques described herein of a second registered user with respect to a device. The engine 150 may also make available the different modes of communication and current status of each for user registered devices. Using such information, one user may determine the best way to contact or reach another user. For example, a first user may obtain information from the engine 150 indicating that a second user is away from his/her computer and office phone but is physically present near his/her mobile phone. The information also indicates that the second user has only text communications enabled for the mobile phone since he/she is in an all-day offsite meeting. As such, the first user having an urgent message for the second user may send a text message to the second user.

Each device has its own physical presence setting as determined using the techniques described herein. When one of the devices boots up, such as a phone or computer system, device authentication may be performed. In one embodiment, the user is prompted for a username and password to be used for authentication with the server computer. In an embodiment, a user may be allowed to selectively enable/disable presence detection for one or more registered devices. Presence detection may refer to determining physical presence as well as availability of a user for device with respect to one or more modes of communication. As a default, presence detection may be performed for all registered devices associated with a user identifier. The selective enabling/disabling of presence detection for registered devices may be performed in connection with registration on the server computer and may be updated at a later point in time. For example, when a device boots up, a user may be allowed to specify whether to enable or disable presence detection for the device. The enabling/disabling of presence detection for a device may also be characterized as dynamic information that may be modified at boot up and/or subsequent to boot up, and then communicated to the client application 42 as secondary indicator information. Such information may be further communicated to the presence aggregation engine 150 at the server computer.

An embodiment may also allow a user to selectively enable/disable different communication modes for a registered device. For example, a device may be capable of receiving voice, text, and video and may be accordingly registered on the server computer for a particular user. Even though the device is capable of all three modes of communication, a user may selectively choose to enable/disable one or more of these three modes. The selective enabling/disabling of certain modes of communication may be specified as part of registration, device boot up, and/or further modified after boot up. The enabling/disabling of certain modes of communication as part of device boot up and/or subsequent to boot up may be characterized as dynamic information communicated to the client application 42 as secondary indicator information. Such information may further be communicated to the presence aggregation engine 150 at the server computer.

Figure 4:
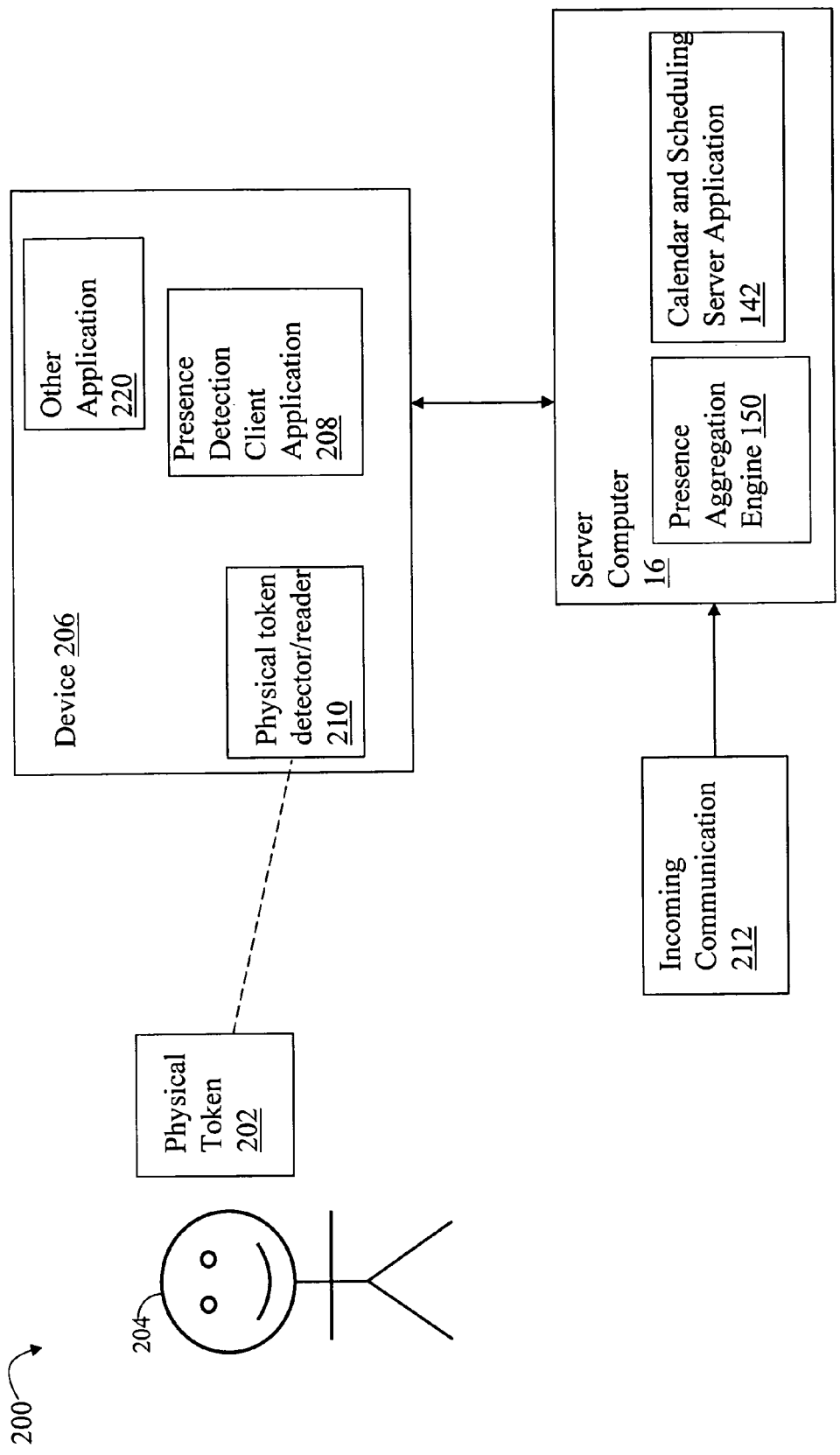
FIG. 4 is an example illustrating data flow between some of the components of FIGS. 2 and 3 in connection with the techniques described herein.

Referring now to FIG. 4, shown is an example 200 illustrating the data flow between components of a device and the server computer in one embodiment. It should be noted that the components of FIG. 4 make reference to similarly named components described elsewhere herein such as in connection with FIGS. 2 and 3. It should be noted that the device 206 represents any device that has connectivity to the server computer 16. Particular examples of a device 206 are illustrated, for example, as elements 12, 15 and 17 of FIG. 1.

In the example 200, a user 204 has a physical token 202. The detector/reader module 210 is used in connection with determining the physical presence or proximity of the physical token 202 to the device 206. If the module 210 determines that the physical token is near the device 206, such as in connection with use of an RFID tag, the module 210 communicates the information regarding the physical token to the presence detection client application 208. The client application 208 may receive also receive a manual physical presence setting and secondary indicator information, for example, from another application 220. The client application 208 may report received information to the presence aggregation engine 150 of the server computer 16. The engine 150 may obtain other secondary indicator information from the calendar and scheduling server application 142.

When an incoming communication 212 is received at the server 16, the presence aggregation engine 150 uses its aggregated information in connection with forwarding the transmission 212 to the device. The aggregated information may include dynamic information such as communicated from the client application 208.

Figure 5:
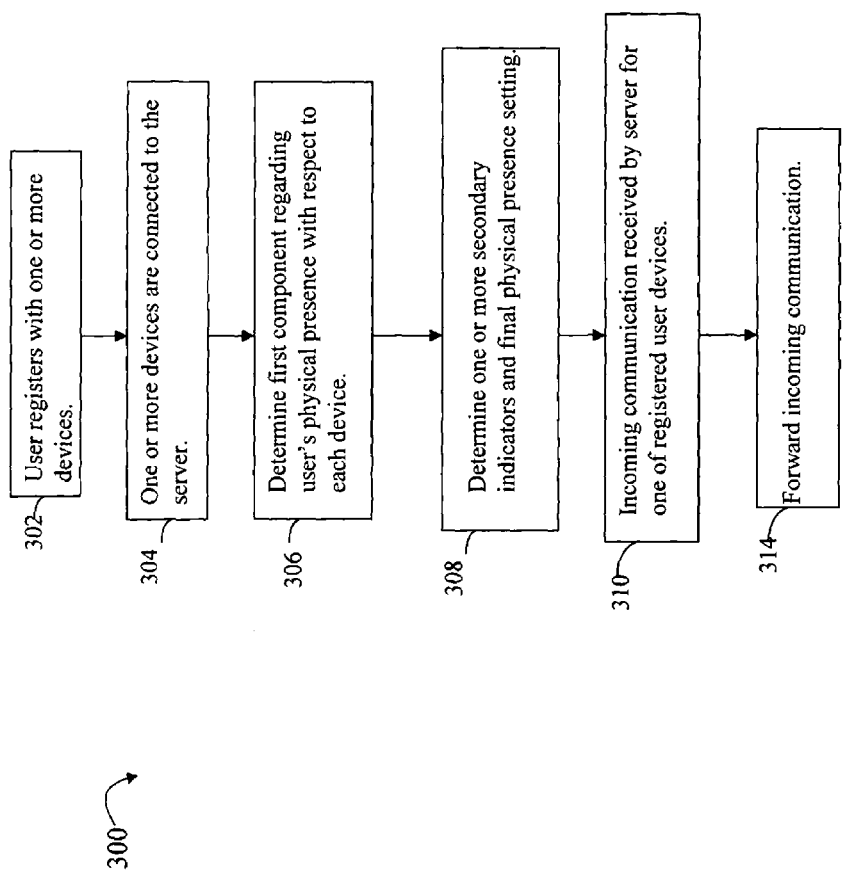
FIG. 5 is a flowchart of processing steps that may be performed in an embodiment in connection with the techniques described herein.

Referring now to FIG. 5, shown is a flowchart 300 summarizing the processing steps just described in connection with the techniques described herein. At step 302, a user registers one or more devices such as using the registration module on the server computer 16. At step 304, one or more of the registered devices are connected to the server. Step 304 may include performing device authentication as described herein in order to establish connectivity to the server and associate the device with a particular registered user having a user identifier. At step 306, a first component regarding the user's physical presence with respect to each device is determined. At step 308, one or more secondary indicators and/or a manual physical presence setting may be obtained and the final physical presence setting regarding the user's physical presence is determined. The final presence setting may be determined using information communicated from the physical token detector/reader module, manual physical presence setting, and may also use information communicated as one or more secondary indicators. At step 310, an incoming transmission is received by the server for one of a registered user's device. At step 314, the received incoming transmission is forwarded to the device in accordance with information aggregated at the server computer, such as by the presence aggregation engine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving first information indicating whether a physical token associated with a user of a device is detected;
   receiving second information from an application program indicating whether said device is active;
   receiving third information from the application program indicating an enabled mode of communications to forward to said device based on a current physical state of said device, wherein the enabled mode of communications comprises a text transmission mode or a voice transmission mode, the voice transmission mode indicated as enabled and the text transmission mode indicated as disabled when a keyboard associated with said device is unavailable;
   determining a physical presence setting for said user with respect to said device in accordance with said first information; said second information; and said third information;
   communicating the physical presence setting for said user with respect to said device to other devices, wherein the communicated physical presence setting includes information describing the enabled mode of communications to forward to said device; and
   forwarding communications to said device in accordance with the physical presence setting.

2. A method comprising:
   identifying a presence setting associated with a user, responsive to a determination that relates a physical token, associated with the user, with the presence setting;
   communicating, to a device, information related to the presence setting, the information being usable to cause the device to set an operating characteristic of the device, wherein the presence setting comprises an indication of whether the device is active and an enabled mode of communications to forward to the device based on a physical state of the device, wherein the enabled mode of communications comprises a text transmission mode or a voice transmission mode, the voice transmission mode indicated as enabled and the text transmission mode indicated as disabled when a keyboard associated with said device is unavailable; and
   communicating the presence setting for the device to other devices, wherein the communicated presence setting includes information describing the enabled mode of communications to forward to the device.

3. The method of claim 2, further comprising aggregating presence information, from an application associated with the user, for use in making the determination.

4. The method of claim 3, wherein the application comprises an application that includes a schedule function.

5. The method of claim 2, wherein the identifying comprises selecting the presence setting from among a group of presence settings that are each associated with different locations.

6. The method of claim 2, wherein the operating characteristic causes the device to prevent completion of a communication when implemented by the device.

7. The method of claim 2, wherein the device comprises a mobile communication device.

8. One or more computer storage media comprising instructions that, responsive to being executed by a computing system, cause the computing system to:
   select a presence setting, from a group of presence settings, that corresponds to an operating characteristic that is to be used when a physical token for a user is associated with the presence setting;
   set the computing system to operate in conformance with the operating characteristic responsive to a determination that associates the physical token with the presence setting, wherein the presence setting comprises an indication of whether the device is active and an enabled mode of communications to forward to the device based on a physical state of the device, wherein the enabled mode of communications comprises a text transmission mode or a voice transmission mode, the voice transmission mode indicated as enabled and the text transmission mode indicated as disabled when a keyboard associated with said device is unavailable; and
   communicate the presence setting for the device to other devices, wherein the communicated presence setting includes information describing the enabled mode of communications to forward to the device, and wherein the one or more computer-readable storage media does not comprise a signal.

9. One or more computer storage media of claim 8, wherein the operating characteristic is usable to cause the computing system to block completion of a communication.

10. One or more computer storage media of claim 8, wherein the instructions further comprise instructions that cause the computing system to forward a communication to a mobile communication device when the physical token is not detected within an area adjacent to the computing system.

11. One or more computer storage media of claim 8, wherein the instructions further comprise instructions that cause the computing system to aggregate presence information from at least one application associated with the computing system to determine whether the user is present within an area adjacent to the computing system.

12. One or more computer storage media of claim 11, wherein the at least once application comprises an application that includes a schedule function.

13. One or more computer storage media of claim 11, wherein the presence information comprises information that is usable by the computing system to determine a period of time that the computing system is to operate in conformance with the operating characteristic.

* * * * *